United States Patent [19]
Cepynsky et al.

[11] Patent Number: 6,111,731
[45] Date of Patent: *Aug. 29, 2000

[54] MOTOR CONTROLLER FOR PREVENTING EXCESSIVE BATTERY DISCHARGING

[75] Inventors: George L. Cepynsky, Lisle; William H. Slavik, Palos Hills, both of Ill.

[73] Assignee: Technical Products Group, Inc., Lombard, Ill.

[*] Notice: This patent issued on a continued prosecution application filed under 37 CFR 1.53(d), and is subject to the twenty year patent term provisions of 35 U.S.C. 154(a)(2).

[21] Appl. No.: 09/031,308

[22] Filed: Feb. 26, 1998

[51] Int. Cl.⁷ .............................. H02H 3/24; F02N 11/08
[52] U.S. Cl. .............................. 361/23; 361/92; 307/107; 318/139
[58] Field of Search ............................ 361/23, 30, 33, 361/25, 24, 78, 79, 86, 87, 92, 160, 170, 187; 307/10.6, 10.7; 320/135, 136, 164; 318/139, 587; 322/28, 16

[56] References Cited

U.S. PATENT DOCUMENTS

| | | |
|---|---|---|
| 4,028,616 | 6/1977 | Stevensw . |
| 4,228,427 | 10/1980 | Niedermeyer . |
| 4,493,001 | 1/1985 | Sheldrake .................... 361/92 |
| 4,521,735 | 6/1985 | Kageyama et al. . |
| 4,660,027 | 4/1987 | Davis . |
| 4,937,528 | 6/1990 | Palanisamy . |
| 5,140,250 | 8/1992 | Morland ........................ 320/13 |
| 5,200,877 | 4/1993 | Betton et al. .................. 361/92 |
| 5,272,380 | 12/1993 | Clokie ........................ 307/107 |
| 5,296,997 | 3/1994 | Betton et al. . |
| 5,321,389 | 6/1994 | Meister . |
| 5,332,958 | 7/1994 | Sloan ........................... 320/13 |
| 5,343,137 | 8/1994 | Kitaoka et al. ............... 320/13 |
| 5,442,345 | 8/1995 | Kwon ...................... 340/825.46 |
| 5,691,619 | 11/1997 | Vingsbo ......................... 361/86 |
| 5,798,577 | 8/1998 | Lesesky et al. . |
| 5,808,428 | 9/1998 | Ito et al. ....................... 318/139 |

FOREIGN PATENT DOCUMENTS

| | | |
|---|---|---|
| 0621675 | 10/1994 | European Pat. Off. . |
| 1148931 | 4/1969 | United Kingdom . |
| 1155263 | 6/1969 | United Kingdom . |
| 1213085 | 11/1970 | United Kingdom . |
| 2260635 | 4/1993 | United Kingdom . |
| WO91/15889A1 | 10/1991 | WIPO . |

OTHER PUBLICATIONS

WPI Abstract Accession No. 1999–447187 & JP110165540A (Matsushita) Jun. 22, 1999 (see abstract).
WPI Abstract Accession No. 1997–521561 & JP090249184A (Suzuki) Sep. 22, 1997 (see abstract).

*Primary Examiner*—Josie Ballato
*Assistant Examiner*—Kim Huynh
*Attorney, Agent, or Firm*—Brinks Hofer Gilson & Lione

[57] ABSTRACT

A motor controller for a battery-powered electric motor automatically disables the motor when the battery voltage (1) remains below a first, higher level for a longer time when the motor is off, or (2) remains below a second, lower level for a longer time when the motor is on, or (3) falls below a low level less than about one quarter the nominal level of the voltage for a shorter time. The motor is automatically enabled when the battery voltage rises to a higher level for a preset time period, indicative of charging of the battery.

22 Claims, 2 Drawing Sheets ns, reduces

MOTOR CONTROLLER FOR PREVENTING EXCESSIVE BATTERY DISCHARGING

BACKGROUND

This invention is directed to a motor controller for a battery-powered electric motor. The motor controller described below prevents undue battery drains, reduces motor damage, and reduces battery damage.

It is known in the art to provide a delivery truck with a hydraulically powered lift gate. Such lift gates are typically raised by a hydraulic pump driven by an electric motor. The electric motor in turn is powered by the electrical system of the delivery truck.

On many occasions, the lift gate is used while the internal combustion engine of the delivery truck is not running. Under these conditions, it is the battery of the electrical system of the truck that supplies power for the electric motor. Extensive use of the lift gate can drain the battery to the point where the battery has insufficient power to restart the internal combustion engine of the delivery truck. This can leave the delivery truck and the driver stranded. Also, if the pump motor is used extensively without running the engine of the delivery truck, the battery can be drained to the point where the battery is damaged, shortening the life of the battery. Furthermore, running the pump motor at a low voltage can shorten the life of the motor.

Another prior-art problem relates to poor connections causing a high resistance between the battery and the pump motor. Such high resistance connections can cause the solenoid of the pump motor to oscillate or chatter.

The present invention is directed to a motor controller that overcomes some or all of the drawbacks of the prior art discussed above.

SUMMARY

The present invention is defined by the following claims, and nothing in this section should be taken as a limitation on those claims. By way of introduction, it can be said that the motor controller described below monitors the battery voltage applied to the pump motor to disable the pump motor under any of the following three circumstances:

1. when the voltage remains below a first, higher level for a longer time and the pump motor is off;
2. when the voltage remains below a second, lower level for a longer time and the pump motor is on;
3. when the voltage falls below a low threshold less than about 25% of the nominal value of the voltage for a shorter time.

Whenever an error condition is detected as described above, this condition is latched, and the pump motor is disabled until the controller circuit is reset. Preferably, the controller circuit is reset when the voltage signal rises above a selected value characteristic of battery charging.

DETAILED DESCRIPTION OF THE PRESENTLY PREFERRED EMBODIMENTS

Figure 1:
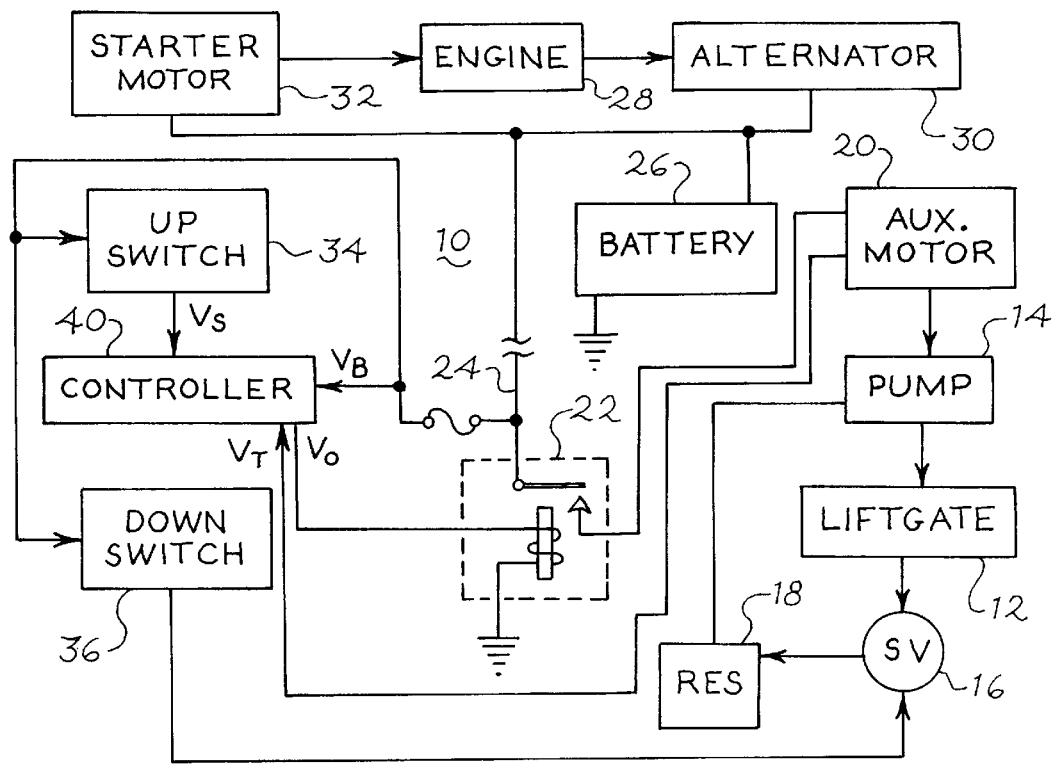
FIG. 1 is a block diagram of a vehicle lift gate system that incorporates a preferred embodiment of this invention.

Turning now to the drawings, FIG. 1 shows a block diagram of a lift gate system 10 suitable for use on a delivery vehicle. The lift gate system 10 includes a hydraulically powered lift gate 12, which is essentially a platform guided for vertical movement between a lower position near ground level and an upper position near the truck bed. The lift gate is powered by hydraulic cylinders. These hydraulic cylinders are raised by pressurized hydraulic fluid from hydraulic pump 14 and lowered by a solenoid valve 16. When the solenoid valve 16 opens, hydraulic fluid from the hydraulic cylinders of the lift gate 12 is allowed to return to a low pressure reservoir 18. The hydraulic pump 14 draws hydraulic fluid from the reservoir 18 to lift the lift gate 12.

The hydraulic pump 14 is powered by an auxiliary electric motor 20. DC current to drive the auxiliary motor 20 is supplied by a conductor 24 and is switched by a solenoid 22. In the unenergized state, the solenoid 22 isolates the auxiliary motor 20 from the conductor 24. In the energized state, the solenoid 22 provides a low-resistance connection between the auxiliary motor 20 and the conductor 24.

The conductor 24 is connected to the positive terminal of a battery 26, which is typically the main rechargeable storage battery of a vehicle having a 12 volt electrical system. In cases where the battery 26 is positioned near the internal combustion engine 28 of the vehicle and the lift gate 12 is positioned near the rear of the vehicle, the conductor 24 may be of substantial length. The engine 28 drives an alternator 30 in the conventional manner to charge the battery 26, and the battery 26 also provides power to a starter motor 32 used in the conventional manner to start the engine 28. Thus, the same battery 26 powers both the starter motor 32 and the auxiliary motor 20. In the event the auxiliary motor 20 drains the battery 26 excessively and the engine 28 is off, there may be insufficient reserve in the battery 26 to restart the engine 28.

The lift gate 12 is controlled by an up switch 34 and a down switch 36 the up switch 34 applies a switching voltage $V_S$ to a motor controller 40, and the motor controller 40 provides an output voltage $V_O$ to control the solenoid 22. The structure and the operation of the motor controller 40 are described in substantial detail below. The down switch 36 applies a control voltage to the solenoid valve 16 such that when the down switch is closed the solenoid valve 16 is opened and the lift gate 12 is allowed to descend. Typically, the up switch 34 and the down switch 36 are user-operated switches, and they are preferably constructed as described in co-pending U.S. patent application Ser. No. 09/031,030 filed Feb. 26, 1998, assigned to the assignee of the present invention.

Figure 2:
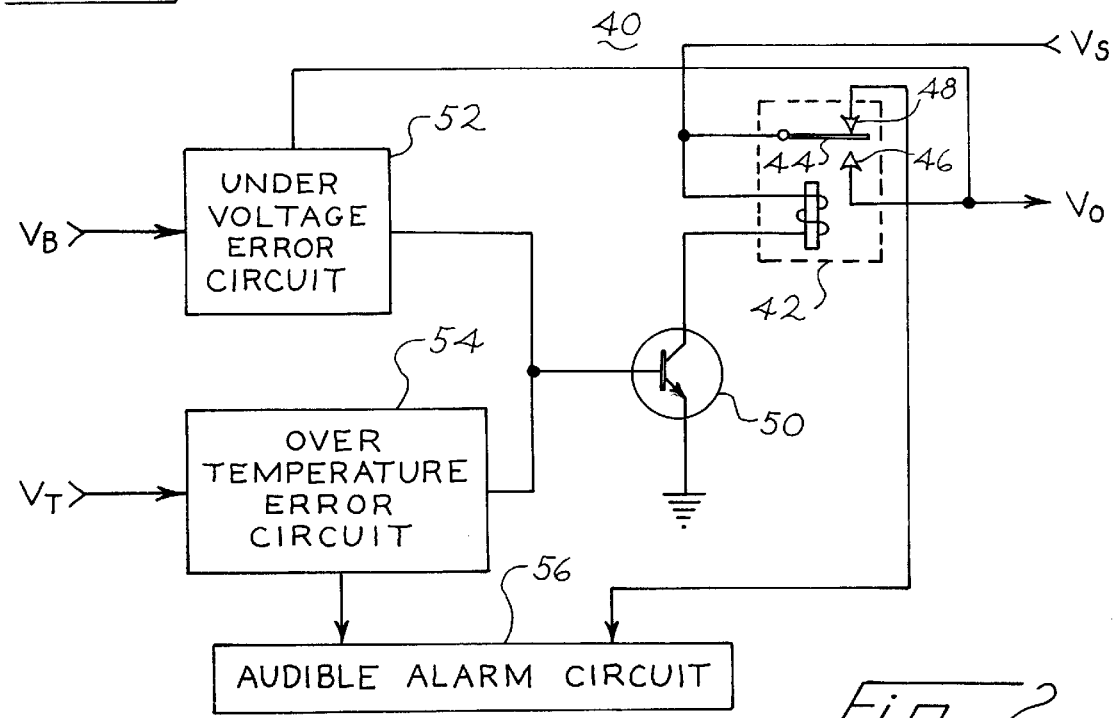
FIG. 2 is a block diagram of the controller of FIG. 1.

As shown in FIG. 2, the controller 40 receives as input signals $V_S$, $V_B$, and $V_T$. The switch voltage $V_S$ is held at $V_B$ when the up switch 34 of FIG. 1 is closed. The battery voltage $V_B$ provides the controller 40 with a measure of the battery voltage at a point adjacent to the auxiliary motor 20. It is important to recognize that the battery voltage $V_B$ is measured near the auxiliary motor 20, and in many cases at some distance from the battery 26. Because of inevitable resistance in the conductor 24, the battery voltage $V_B$ will be measurably lower when the auxiliary motor 20 is running (and transmission losses are high) than when the auxiliary motor 20 is off (and transmission losses are low).

The thermistor voltage $V_T$ provides an analog voltage that varies as a function of the temperature of the motor 20. A thermistor (not shown) that has a variable resistance that decreases with increasing temperature is mounted on the controller near the motor 20. This thermistor is connected to a positive voltage, such that the higher the temperature in the motor 20, the higher the thermistor voltage $V_T$. The controller 40 generates an output voltage $V_O$ that is applied to power the solenoid 22 as shown in FIG. 1.

As shown in FIG. 2, the controller 40 includes a relay 42 having a center contact 44, a normally open contact 46 and a normally closed contact 48. The relay 42 is connected to ground via a switch 50. During normal operation, the switch 50 is maintained in a conducting state. A positive voltage $V_S$ switches the relay 42, and causes the switch voltage $V_S$ to be applied via the normally open contact 46 as the output voltage $V_O$. In the event an error condition is detected by the controller 40, the switch 50 is opened, and the switch voltage $V_S$ is passed via the normally closed contact 48 to an audible alarm circuit 56.

The controller 40 includes an under-voltage error circuit 52 that is responsive both to the battery voltage $V_B$ and to the output voltage $V_O$. The under-voltage error circuit 52 normally supplies a signal to hold the switch 50 in a conducting state. However, in the event the battery voltage $V_B$ remains below a threshold of 12.2 volts for more than five seconds and the auxiliary motor is not running (as indicated by a low voltage $V_O$), a comparison circuit included in the under-voltage error circuit 52 turns off the switch 50, thereby disabling the relay 42 and therefore the auxiliary motor. Similarly, when the auxiliary motor is running, the comparison circuit of the under-voltage error circuit 52 turns off the switch 50 in the event the battery voltage $V_B$ remains below a threshold of 10.0 volts for more than five seconds. As explained above, the auxiliary motor draws substantial current through the conductor 24 of FIG. 1, and this current causes transmission losses that lower the battery voltage $V_B$.

The under-voltage error circuit 52 also compares the battery voltage $V_B$ to a low level threshold of approximately 2.5 volts. In the event the battery voltage $V_B$ falls below this low threshold for even a short time such as 0.1 seconds, an error condition is latched to open the switch 50 and to disable the auxiliary motor 20. This error condition represents a danger to the solenoid 22, because applied voltages less than this level may result in chatter and resulting damage to the solenoid 22.

The under-voltage error circuit 52 automatically latches an error condition if any of the three situations described above is detected. This error condition is maintained and the switch 50 is held in the off state, until the battery voltage $V_B$ exceeds 13.3 volts for more than five seconds and the error circuit 52 is automatically reset.

The under-voltage error circuit 52 protects the lift gate system 10 of FIG. 1 from excessive battery drain. In particular, in this preferred embodiment it has been determined after extensive testing that battery voltage in excess of 12.2 volts (with the auxiliary motor off) represents approximately a 40% charge remaining in the battery 26. This is a charge sufficient to allow the battery 26 to start the engine 28 in the large majority of cases. Similarly, it has been determined that a battery voltage $V_B$ greater than 10.0 volts (with the auxiliary motor on) represents a battery capacity sufficient to start the engine 28. In this way, the controller 40 automatically prevents operation of the auxiliary motor 20 or interrupts operation of the auxiliary motor 20 to preserve sufficient battery capacity to start the engine 28. The error condition is held until the battery $V_B$ exceeds 13.3 volts, which typically occurs only after the engine 28 has been started and the battery 26 is being charged by the alternator 30.

As shown in FIG. 2, the controller 40 also includes an over-temperature error circuit 54. The circuit 54 is responsive to the thermistor voltage $V_T$, and it opens the switch 50 whenever an excessive temperature is detected.

When the switch 50 is open and the relay 42 is maintained in the unenergized state, the switch voltage $V_S$ is applied to the audible alarm circuit 56. When the relay 42 is unenergized and the switch voltage $V_S$ in the $V_B$ state, the audible alarm circuit 56 generates a continuous tone in the event of an under-voltage error condition and an intermittent tone in the event of an over-temperature error condition.

Figure 3:
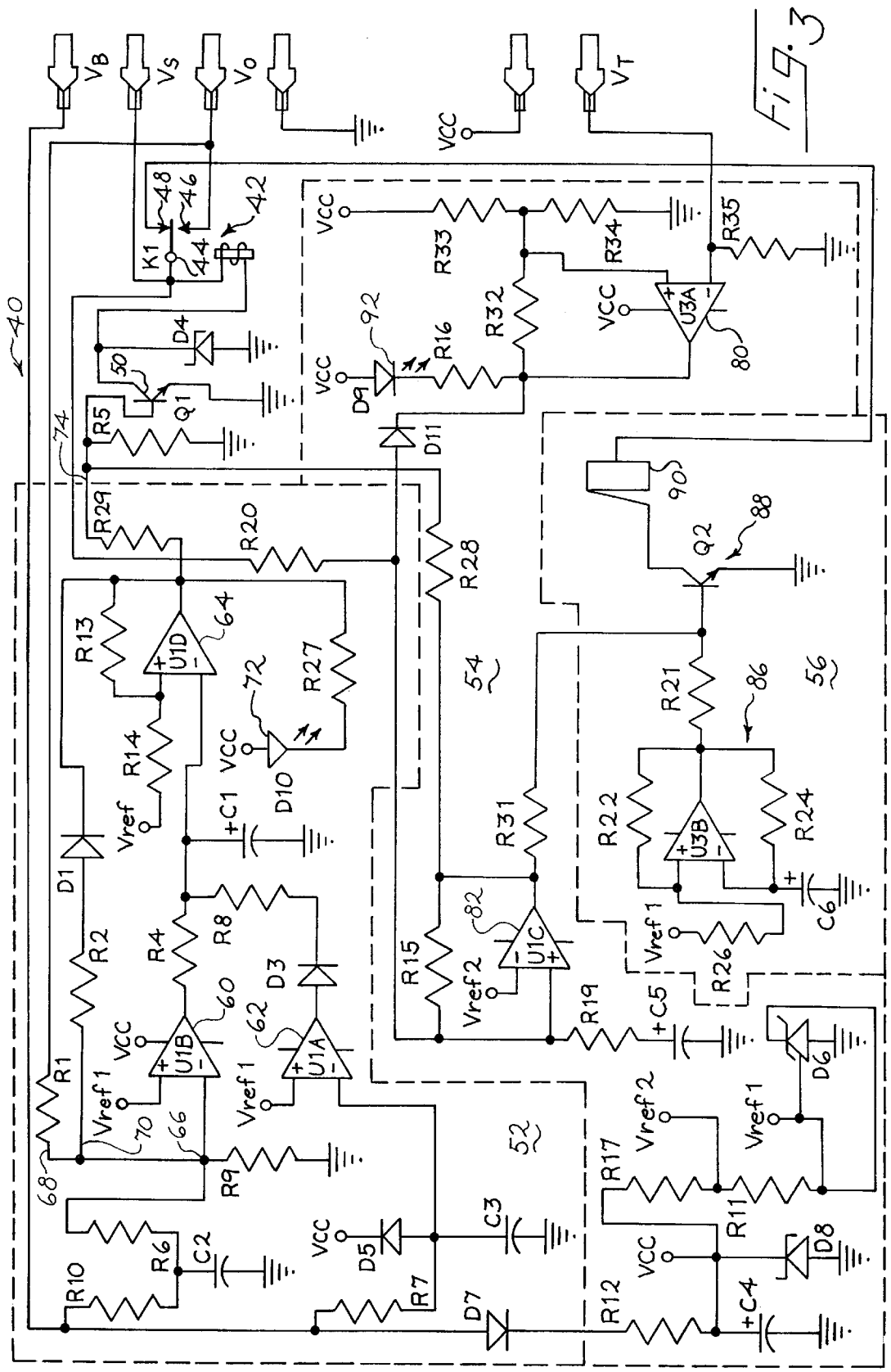
FIG. 3 is a schematic diagram of the controller of FIG. 2.

Those skilled in the art will recognize that the functions performed by the controller 40 as described above can be implemented in many ways, using analog and/or digital comparison circuits. For example, when an analog comparison circuit is used, a separate comparator can be provided for each of the low voltage tests described above. When a digital comparison circuit is used, the battery voltage $V_B$ can be digitized and the various low voltage tests described above can be performed digitally, using a programmed microprocessor. The preferred embodiment for the controller 40 is shown in FIG. 3. This embodiment uses analog circuitry that operates reliably even under low voltage conditions. Rather than using a separate comparator for each of the low voltage conditions described above, the circuit of FIG. 3 reduces the required hardware by using a single comparator for multiple functions.

Turning now to FIG. 3, the under-voltage error circuit 52, the over-temperature error circuit 54 and the audible alarm 56 are generally indicated. In FIG. 3, the comparator 60 tests the battery voltage $V_B$ against the 10.0 voltage threshold, the 12.2 voltage threshold, and the 13.3 voltage threshold, at appropriate times. The comparator 62 tests the battery voltage $V_B$ against the 2.5 voltage threshold. In the event either the comparator 60 or the comparator 62 detects a low voltage condition, the error condition is latched by the latch 64. The output of the latch 64 is a path 74 that carries a motor disable signal to the switch 50.

The comparator 60 functions in the absence of an error condition (as indicated by the voltage on the path 70) and when the auxiliary motor is not running (as indicated by the voltage on the path 68) to generate an error condition in the event the battery voltage $V_B$ remains below 12.2 volts for five seconds. In this mode of operation, no current is flowing through the paths 68, 70. During the time when the auxiliary motor is running, as indicated by a positive voltage on the path 68, an additional voltage is summed with the battery voltage $V_B$ at the summing node 66. This has the effect of lowering the effective threshold of the comparator 60 to 10.0 volts. Similarly, when the latch 64 has latched to indicate an error condition, the path 70 carries current away from the summing node 66, thereby effectively raising the switching threshold of the comparator 60 to 13.3 volts. In this way, hardware requirements are minimized.

Whenever an error condition is latched by the under-voltage error circuit 52, a yellow LED 72 is illuminated to advise the user as to the reason that the auxiliary motor is being disabled.

As shown in FIG. 3, the over-temperature error circuit 54 includes a latch 80 that compares the thermistor voltage $V_T$ with a threshold, and latches the output of the latch 80 to the low voltage level in the event the voltage $V_T$ exceeds the threshold. A low voltage on the output of the latch 80 causes the thermal switch latch 82 to latch in the low state. This provides a motor disable signal to the switch 50, placing the switch 50 in the non-conducting state. When an over-temperature condition is latched, a red LED 92 is illuminated to indicate the error condition to the user. The latch 82 is reset only when the thermistor temperature $V_T$ falls to a suitably low value, and the switch voltage $V_S$ has been present for sufficient time to charge the capacitor C5 associated with the latch 82 (e.g., five seconds). In this way, inadvertent operation is prevented.

The audible alarm circuit 56 includes an oscillator 86, a switch 88, and a buzzer 90. The buzzer 90 is only energized when the relay 42 is deactivated by the switch 50 and a switch voltage $V_S$ is applied via the normally closed contact to the buzzer 90 and the switch 88. In the event of an over-temperature error condition, the latch 82 holds the switch 88 open continuously, causing the buzzer 90 to produce a continuous tone. In the event of a low-voltage error condition, the oscillator 86 switches the switch 88 on and off, thereby causing the buzzer 90 to produce an intermittent tone.

Simply by way of example and to define the presently preferred embodiment of this invention, Table 1 provides exemplary values and identification for the components shown in FIG. 3. Unless otherwise specified, the resistors are ¼-watt, 5% resistors, and the nonpolarized capacitors are ceramic capacitors (10%). Of course, other components can readily be substituted.

TABLE 1

| Resistors | Ohms | Capacitors | Microfarad |
|---|---|---|---|
| R1 | 169K (1%) | C1 | 47/16V |
| R2 | 56.2K (1%) | C2 | .47 |
| R4 | 100K | C3 | .1 |
| R5 | 1.2K | C4 | 470/16V |
| R6 | 18.2K (1%) | C5 | 100/16V |
| R7 | 33K | C6 | 4.7/16V |
| R8 | 220 | Semiconductors | Component No. |
| R9 | 10K (1%) | D1 | 1N914 |
| R10 | 18.7K (1%) | D3 | 1N914 |
| R11 | 1K | D4 | 1N971B |
| R12 | 220 | D5 | 1N914 |
| R13 | 100K | D6 | TL431 |
| R14 | 10K | D7 | IN4004 |
| R15 | 100K | D8 | IN971B |
| R16 | 1K | D9 | Red LED |
| R17 | 1.2K | D10 | Yellow LED |
| R19 | 1K | D11 | 1N914 |
| R20 | 47K | D12 | 1N914 |
| R21 | 10K | Q1 | 2N3904 |
| R22 | 100K | Q2 | 2N3904 |
| R24 | 100K | U1 | LM324 |
| R26 | 100K | U3 | LM358 |
| R27 | 1K | Relay | |
| R28 | 22K | K1 | 77–10024.100 (SPDT) |
| R29 | 22K | | |
| R31 | 10K | | |
| R32 | 82.5K (1%) | | |
| R33 | 10.0K (1%) | | |
| R34 | 10.0K (1%) | | |
| R35 | 1.37K (1%) | | |

From the foregoing, it should be apparent that the under-voltage error circuit functions as a means for disabling the auxiliary motor under the low voltage conditions described above. As pointed out above, the means for disabling the auxiliary motor under low-voltage conditions can be implemented using analog and/or digital comparison circuits, and a wide variety of conventional circuitry can be adapted to the functions described above.

Similarly, it should be apparent that the circuit path 70, the summing node 66 and the capacitor C2 cooperate to form a means for resetting the comparator circuit 60 to remove the motor-disable signal when the voltage signal rises above a selected value indicative of battery charging. As before, the resetting means can be implemented using analog and/or digital circuitry, including a wide variety of conventional circuit techniques, It should be apparent from the foregoing that an improved motor controller has been described that protects the battery against excessive drains from the auxiliary motor and therefore from damage, that reduces or eliminates the danger that the truck and driver will be stranded due to excessive use of the lift gate with the internal combustion engine off, and that protects the auxiliary motor solenoid when the battery voltage is excessively low. Since motor operation is prevented when battery voltage is low, both the battery and the pump motor are protected from use under life-shortening conditions. The entire system automatically resets after an error condition when the internal combustion engine is started and charging of the battery is resumed.

The term "responsive to" is intended broadly. Thus, a first element is said to be responsive to a second element whether it is directly responsive or indirectly responsive with one or more intervening elements between the first and second elements.

Similarly, a comparison circuit is said to generate an output signal when a voltage signal falls below a level or rises above a level regardless of the required time period. For example, such a comparison circuit may generate an output signal only when the voltage signal falls below a given level for a shorter or longer time period, depending upon the application.

Many modifications are possible. For example, the specific voltage thresholds and time thresholds can be raised or lowered as appropriate for the voltage tests described above, and the widest variety of circuit implementations can be used.

The foregoing detailed description has described only a few of the many forms this invention can take. For this reason, it is intended that this detailed description be regarded as illustrative rather than limiting. It is only the following claims, including all equivalents, that are intended to define the scope of this invention.

What is claim is:

1. A motor controller for an electric motor, said motor controller comprising:

a first conductor carrying a voltage signal indicative of a voltage level associated with the electric motor;

a second conductor carrying a motor activation signal indicative of an on/off state of the motor;

a comparison circuit responsive to the voltage signal and the motor-activation signal to generate a motor disable signal, said motor disable signal having a motor enable state and a motor disable state, said motor disable signal operative in the motor disable state to disable the motor, thereby preventing operation of the motor and interrupting operation of the motor if on, said comparison circuit operative to change state of the motor disable signal from the motor enable state to the motor disable state both (1) when the voltage signal falls below a first, higher level and the motor activation signal indicates that the motor is off, and (2) when the voltage signal falls below a second, lower level and the motor activation signal indicates that the motor is on.

2. The invention of claim 1 wherein the comparison circuit further comprises means for generating the motor disable signal when the voltage signal falls below about 25% of a nominal battery voltage value.

3. The invention of claim 1, wherein the comparator circuit further comprises means for automatically resetting the comparator circuit to place the motor disable signal in the motor enable state when the voltage signal rises above a third selected value.

4. The invention of claim 1, wherein the comparison circuit comprises analog comparators.

5. The invention of claims 1, further comprising:
 a switch responsive to the motor disable signal, said comparison circuit operative to change state of the switch from closed to open to disable the motor when the voltage signal falls below the first level while the motor is off; said comparison circuit also operative to change state of the switch from closed to open to disable the motor when the voltage signal falls below the second level while the motor is on.

6. The invention of claim 1, further comprising:
 a battery, a battery charger coupled with the battery, an electric motor, and a solenoid coupling the motor to the battery, said motor disable signal operative in the motor disable state to disable the solenoid.

7. The invention of claim 6, wherein the motor powers a hydraulic pump, and wherein the hydraulic pump powers a lift gate.

8. A motor controller for an electric motor, said motor controller comprising:
 a first conductor carrying a voltage signal indicative of a voltage level associated with the electric motor;
 a second conductor carrying a motor activation signal indicative of an on/off state of the motor;
 means for changing state of the motor from enabled to disabled both (1) when the voltage signal makes a transition from above to below a first, higher level and the motor activation signal indicates that the motor is off, and (2) when the voltage signal makes a transition from above to below a second, lower level and the motor activation signal indicates that the motor is on.

9. The invention of claim 8, wherein the disabling means comprises analog comparators.

10. The invention of claim 8, wherein the disabling means comprises:
 means for comparing the voltage signal against a first, higher threshold when the motor activation signal indicates that the motor is off; and
 means for comparing the voltage signal against a second, lower threshold when the motor activation signal indicates that the motor is on.

11. In a battery-powered electric motor system comprising a battery having a nominal voltage level, a battery charger coupled with the battery, and an electrical motor selectively coupled with the battery, a motor controller comprising:
 a first conductor carrying a voltage signal indicative of a voltage level applied by the battery to the motor;
 a comparison circuit responsive to the voltage signal to disable the motor while preserving a connection between the battery and the battery charger
 (1) when the voltage remains below a first, higher threshold for at least a first, longer time period, and
 (2) when the voltage remains below a second, lower threshold for at least a second, shorter time period.

12. The invention of claims 9 or 11 wherein said second, lower threshold corresponds to about 25% of the nominal voltage level of the battery.

13. The invention of claim 11 or 12 wherein the first and second time periods are both less than 1 minute in duration.

14. The invention of claim 11, wherein the comparison circuit is operative to disable the motor when the voltage remains below the first, higher threshold for at least the first, longer time period at any time during a monitoring interval, and wherein the comparison circuit is operative to disable the motor when the voltage remains below the second, lower threshold for at least the second, shorter time period at any time during the same monitoring interval.

15. The invention of claim 11, wherein the comparison circuit comprises analog comparators.

16. In a battery-powered electric motor system comprising a battery having a nominal voltage level, a battery charger coupled with the battery, and an electrical motor selectively coupled with the battery, a motor controller comprising:
 a first conductor carrying a voltage signal indicative of a voltage level applied by the battery to the motor;
 means for disabling the motor while preserving a connection between the battery and the battery charger
 (1) when the voltage remains below a first, higher threshold for at least a first, longer time period, and
 (2) when the voltage remains below a second, lower threshold for at least a second, shorter time period.

17. The invention of claim 16, wherein the disabling means is operative to disable the motor when the voltage remains below the first, higher threshold for at least the first, longer time period at any time during a monitoring interval, and wherein the disabling means is operative to disable the motor when the voltage remains below the second, lower threshold for at least the second, shorter time period at any time during the same monitoring interval.

18. The invention of claim 16, wherein the disabling means comprises analog comparators.

19. A method for selectively disabling an electric motor comprising:
 (a) monitoring a voltage signal indicative of a voltage associated with the electric motor;
 (b) changing a motor disable signal from a motor enable state to a motor disable state when the voltage signal falls below a first, higher level and the motor is off;
 (c) changing the motor disable signal from the motor enable state to the motor disable state when the voltage signal falls below a second, lower level and the motor is on; and
 (d) disabling the motor when the motor disable signal is in the motor disable state, thereby preventing operation of the motor and interrupting operation of the motor if on.

20. A method of selectively disabling an electric motor, said method comprising:
 (a) monitoring a voltage signal indicative of a voltage applied to the electric motor;
 (b) changing a motor disable signal from a motor enable state to a motor disable state when the voltage signal remains below a first, higher threshold for at least a first, longer time period;
 (c) changing the motor disable signal from the motor enable state to the motor disable state when the voltage signal remains below a second, lower threshold for at least a second, shorter time period; and
 (d) disabling the motor when the motor disable signal is in the motor disable state, thereby preventing operation of the motor and interrupting operation of the motor if on.

21. The method of claim 20, wherein the voltage signal is monitored in (a) for a monitoring period, and wherein (b)

and (c) are both operative at any time in the monitoring period to change the motor disable signal from the motor enable state to the motor disable state when the voltage signal remains below the respective threshold for the respective time period.

22. The method of claim 20, wherein the motor is powered by a battery and wherein the method further comprises:

(e) preserving a connection between the battery and a battery charger while the motor disable signal is in the motor enable state and while the motor disable signal is in the motor disable state.

* * * * *

UNITED STATES PATENT AND TRADEMARK OFFICE
CERTIFICATE OF CORRECTION

PATENT NO. : 6,111,731
DATED : August 29, 2000
INVENTOR(S) : George L. Cepynsky et al.

It is certified that error appears in the above-identified patent and that said Letters Patent is hereby corrected as shown below:

Column 6,
Line 40, (line before claim 1), delete "What is claim is" and substitute -- What is claimed is -- in its place.

Claim 5,
Delete "claims" and substitute -- claim -- in its place.

Claim 12,
Delete "9 or 11" and substitute -- 11 or 16 -- in its place.

Claim 13,
Delete "11 or 12" and substitute -- 11 or 16 -- in its place.

Signed and Sealed this

Twentieth Day of November, 2001

Attest:

*Nicholas P. Godici*

NICHOLAS P. GODICI
*Attesting Officer*    *Acting Director of the United States Patent and Trademark Office*